(12) United States Patent
Haefner et al.

(10) Patent No.: US 11,731,587 B2
(45) Date of Patent: Aug. 22, 2023

(54) WINDSCREEN WIPER SYSTEM FOR A MOTOR VEHICLE

(71) Applicants: AUDI AG, Ingolstadt (DE); DR. ING. H.C.F. PORSCHE AG, Stuttgart (DE); A.RAYMOND ET CIE, Grenoble (FR); VOLKSWAGEN AKTIENGESELLSCHAFT, Wolfsburg (DE)

(72) Inventors: Stephan Haefner, Prebitz (DE); Frank Ackermann, Koenigslutter am Elm (DE); Sven Auch, Stuttgart (DE); Axel Feger, Loerrach (DE); Karl Bode, Loerrach (DE)

(73) Assignees: Audi AG, Ingolstadt (DE); Dr. Ing. H.C.F. Porsche AG, Stuttgart (DE); A. Raymond Et Cie, Grenoble (FR); Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/604,474

(22) PCT Filed: Apr. 14, 2020

(86) PCT No.: PCT/EP2020/060418
§ 371 (c)(1),
(2) Date: Oct. 18, 2021

(87) PCT Pub. No.: WO2020/212322
PCT Pub. Date: Oct. 22, 2020

(65) Prior Publication Data
US 2022/0250586 A1     Aug. 11, 2022

(30) Foreign Application Priority Data

Apr. 16, 2019 (DE) .......................... 102019110083.6

(51) Int. Cl.
*B60S 1/04* (2006.01)
*B60S 1/34* (2006.01)
(Continued)

(52) U.S. Cl.
CPC ........... *B60S 1/0408* (2013.01); *B60S 1/0491* (2013.01); *B60S 1/3415* (2013.01); *B60S 1/4087* (2013.01); *B60S 1/522* (2013.01)

(58) Field of Classification Search
CPC ...... B60S 1/522; B60S 1/4083; B60S 1/4087; B60S 1/3862; B60S 1/0408; B60S 1/0491; B60S 1/3415
(Continued)

(56) References Cited

U.S. PATENT DOCUMENTS 2,799,887 A * 7/1957 Nemic ................. B60Q 1/2684
15/250.201
4,782,547 A    11/1988 Mohnach
(Continued)

FOREIGN PATENT DOCUMENTS

DE      8716154 U1    1/1988
DE      3744237   *   7/1989
(Continued)

*Primary Examiner* — Gary K. Graham
(74) *Attorney, Agent, or Firm* — Laurence A. Greenberg; Werner H. Stemer; Ralph E. Locher

(57) ABSTRACT

A windscreen wiper system for a motor vehicle includes at least one wiper blade which has a slider secured to a wiper blade element. An adapter is connected to the slider in an articulated manner. The adapter is connected to a component of a wiper arm of the windscreen wiper system via a recess. The adapter is connected to a wiper rod of the wiper arm via the recess. A further functional element is arranged on the wiper rod of the wiper arm separately from the adapter.

8 Claims, 5 Drawing Sheets

(51) Int. Cl.
*B60S 1/52* (2006.01)
*B60S 1/40* (2006.01)

(58) Field of Classification Search
USPC .......................... 15/250.04, 250.32, 250.201
See application file for complete search history.

(56) References Cited

U.S. PATENT DOCUMENTS

| | | | | |
|---|---|---|---|---|
| 6,499,179 | B1 * | 12/2002 | Fink | B60S 1/32 |
| | | | | 15/250.04 |
| 10,005,434 | B2 * | 6/2018 | Shimoyama | B60S 1/522 |
| 2015/0217729 | A1 * | 8/2015 | Friscioni | B60S 1/4087 |
| | | | | 15/250.32 |
| 2016/0144827 | A1 | 5/2016 | Ernst et al. | |
| 2021/0323508 | A1 | 10/2021 | Boland | |

FOREIGN PATENT DOCUMENTS

| | | | |
|---|---|---|---|
| DE | 102012021489 | A1 | 5/2013 |
| DE | 102012011225 | * | 12/2013 |
| DE | 102014009721 | A1 | 8/2015 |
| DE | 102015224631 | A1 | 6/2017 |
| EP | 2786906 | A1 | 10/2014 |
| WO | 2017/140343 | * | 8/2017 |
| WO | 2020043264 | A1 | 3/2020 |

\* cited by examiner

WINDSCREEN WIPER SYSTEM FOR A MOTOR VEHICLE

FIELD AND BACKGROUND OF THE INVENTION

The invention relates to a windscreen wiper system for a motor vehicle. The windscreen wiper system has at least one wiper blade, which includes a slider attached to a wiper blade element and an adapter connected to the slider in an articulated manner. The adapter is connectible via a receptacle to a component of a wiper arm of the windscreen wiper system.

Such a windscreen wiper system is for example already known from DE 10 2012 021 489 A1 and includes at least one wiper blade, which includes a slider attached to a wiper blade element as well as an adapter connected to this slider in articulated manner, which is connected to a component in the form of a box-shaped connecting element of a wiper arm of the windscreen wiper system via a receptacle. The connection of the adapter to the connecting element is effected via a form-fit sliding connection until a locking connection secures the adapter to the connecting element.

While this windscreen wiper system includes respective dry wiper arms, in which in addition to the windscreen wiper system, a windscreen washer system completely separately thereto is also provided, which usually includes nozzles in the rear area of a front hood of the motor vehicle, via which the front windscreen can be supplied with a windscreen cleaning liquid, so-called wet wiper arms are increasingly employed since several years, in which the windscreen washer system is integrated in the windscreen wiper system. Herein, diverse components such as hose lines, channels and nozzles are integrated in the respective wiper arm and the associated wiper blade to be able to directly supply the front windscreen with cleaning liquid via the respective wiper arm and the associated wiper blade. In order to accomplish this, it is provided in many systems to integrate parts of the windscreen washer system in the respective wiper blade. However, this is associated with considerable cost and little sustainable since the wiper blades have to be exchanged from time to time as is known and accordingly parts of the windscreen washer system thus also have to be exchanged. An example for such a windscreen wiper system can be taken as known from EP 2 786 906 A1.

Moreover, it is already known to provide parts of a respective wiper arm with wind guiding elements. This is also already known from DE 10 2012 021 489 A1.

SUMMARY OF THE INVENTION

It is the object of the present invention to provide a windscreen wiper system of the initially mentioned type, which is particularly simply constructed and allows a beneficial exchange of the wiper blade while providing diverse functions.

According to the invention, this object is solved by a windscreen wiper system having the features as claimed. Advantageous configurations of the invention are the subject matter of the dependent claims.

The windscreen wiper system according to the invention includes at least one wiper blade, which includes a slider attached to a wiper blade element as well as an adapter connected to the slider in articulated manner. This adapter is connected to a component of the wiper arm of the windscreen wiper system via a receptacle, wherein this component is a wiper rod of the wiper arm according to the invention, which is for example connected to the adapter via a plug-in connection. Therein, a direct connection of the adapter to the wiper rod of the associated wiper arm in particular has the advantage of a particularly simple and inexpensive configuration, since connecting elements between the wiper rod and the adapter are omitted. Rather, the adapter is immediately attached and secured to the wiper rod.

Furthermore, it is provided according to the invention that a further functional element is arranged on the wiper rod of the wiper arm separately from the adapter. This functional element is in particular a wind guiding element, by means of which the aerodynamic characteristics of the respective wiper arm and wiper blade, respectively, are improved. Alternatively or additionally, this functional element can also be provided for integration of a windscreen cleaning device, to hereby provide a so-called wet wiper arm. Since the functional element, which accordingly can be formed as a wind deflector and/or component of the windscreen cleaning device, can be attached to the wiper rod separately from the adapter, an independent configuration of adapter and functional element arises. For example, this has the advantage that upon exchange of the wiper blade, in which the adapter is also disposed of, the functional element in the form of the wind deflector and/or of the component of the windscreen cleaning device remains on the wiper rod and thus an exchange of the wiper blade does not entail disadvantages with respect to the cost or the sustainability. Rather, the functional element completely remains present on the wiper rod by the separate configuration of adapter and functional element.

In further configuration of the invention, the functional element can serve both as a wind deflector and as a part of the windscreen cleaning device. A combination of these two functions in particular has the advantage that the application of cleaning liquid to the windscreen to be cleaned can also be particularly beneficially effected in the slipstream of the wind deflector by the wind deflecting function. In addition, the dual function of the functional element both as a wind deflector and as a part of the windscreen cleaning device has the advantage of a dual use such that the corresponding component can be particularly simply and inexpensively manufactured.

A further advantageous embodiment of the invention provides that the adapter is at least substantially covered by the functional element. Hereby, a particularly beneficial, hidden arrangement of the adapter arises, which for example entails considerable advantages with respect to aerodynamics.

Furthermore, it has proven advantageous if the adapter is connected to the wiper rod in the area of a free end and if the functional element is connected to a length area of the wiper rod spaced from the free end. Hereby, the separate configuration and attachment both of the adapter and of the functional element to the wiper rod can be accomplished in simple and inexpensive manner. Therein, the adapter is preferably arranged at the end of the wiper rod such that the wiper blade can be exchanged from time to time in simple manner. For exchanging the functional element—if it becomes required—the wiper blade first has to be removed from the wiper rod via the adapter before the functional element can be removed from the wiper rod.

In further configuration of the invention, it has proven advantageous if the functional element extends up to a spring case of the wiper arm. If the functional element is herein formed as a part of the windscreen cleaning device, particularly large surfaces of the front windscreen can be wetted with cleaning liquid especially on the driver's side and a wiper blade with considerable length can be supplied with cleaning liquid, respectively.

However, alternatively hereto, it is also conceivable that the functional element terminates at a distance before the spring case of the wiper arm. Hereby, a more inexpensive functional element, which is for example formed as a part of the windscreen cleaning device, can be provided, which easily satisfies the requirements in its functionality, especially in more compact vehicles with smaller front windscreen surface and with shorter wiper blades, respectively.

Furthermore, it has proven advantageous if the functional element is arranged on the wiper rod of the wiper arm secured in extension direction by an attachment device. Hereby, a particularly secure fixing of the functional element to the wiper rod arises.

A further advantageous embodiment of the invention provides that the adapter is fixed to the wiper rod by means of a locking device, wherein the locking device is to be detached by means of an actuating element. By such a locking device on the side of the adapter, it is possible to particularly simply configure the wiper rod and for example to provide only one locking recess, with which a locking element of the adapter can engage, which can in turn be disengaged from the locking recess by the actuating element.

Finally, it has proven advantageous if the functional element has a passage opening, in which the actuating element of the locking device is arranged. Thus, the actuating element can be actuated through the functional element. This has the advantage that the adapter can be arranged behind the functional element and the actuating element can be released in simple manner at the same time to detach the adapter and the entire wiper blade, respectively, from the wiper rod.

In the following, embodiments of the invention are described. Hereto, there shows:

BRIEF DESCRIPTION OF THE FIGURES

FIG. 1a-1c respective perspective representations of a mounting sequence of a functional element, which is formed as a wind deflector and includes a windscreen cleaning device, on a wiper rod of a wiper arm of a windscreen wiper system for a motor vehicle according to a first embodiment, wherein FIG. 1a shows the functional element still separate from the wiper rod, FIG. 1b shows the functional element in partially fitted position on the wiper rod, and FIG. 1c illustrates the functional element completely fitted onto the wiper rod;

FIG. 2a-2c respective partial perspective representations of the functional element of the first embodiment of the windscreen wiper system, wherein FIG. 2a shows the functional element before fitting onto the wiper rod, FIG. 2b shows the functional element in completely fitted position, but not yet secured by means of an attachment device, and FIG. 2c illustrates the functional element subsequently fixed to the wiper rod by means of the attachment device;

FIG. 4a, 4b respective perspective views to a functional element attached to the corresponding wiper rod according to a further embodiment, in which the functional element is formed shorter and accordingly does not extend up to the spring case of the wiper arm, wherein FIG. 4a shows the functional element with an opened attachment device and FIG. 4b with a closed attachment device; and FIG. 5a, 5b respective perspective views of the wiper arm with the functional element mounted thereon according to FIGS. 4a and 4b, wherein FIG. 5a shows a wiper blade before its mounting and FIG. 5b shows the wiper blade after mounting by means of an adapter, which is arranged on and fixed to the free end of the wiper rod of the wiper arm independently of the functional element.

DETAILED DESCRIPTION OF THE INVENTION

Figure 1A:
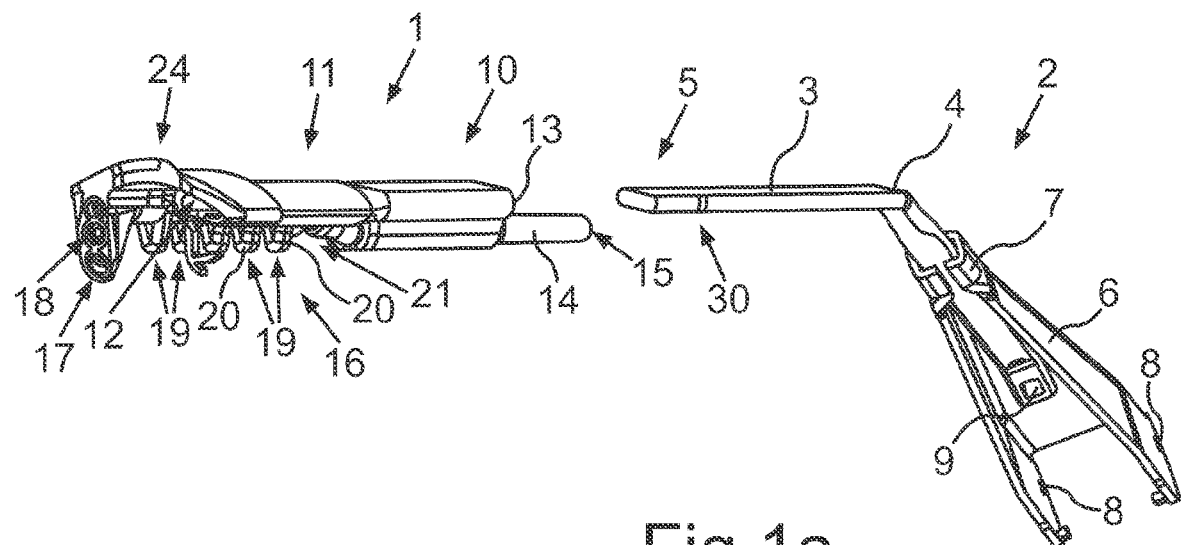

The embodiments explained in the following are preferred embodiments of the invention. In the embodiments, the described components of the embodiments each represent individual features of the invention to be considered independently of each other, which also each develop the invention independently of each other. Therefore, the disclosure also is to encompass combinations of the features of the embodiments other than the illustrated ones. Furthermore, the described embodiments can also be supplemented by further ones of the already described features of the invention.

In the figures, identical reference characters each denote functionally identical elements.

Figure 1B:
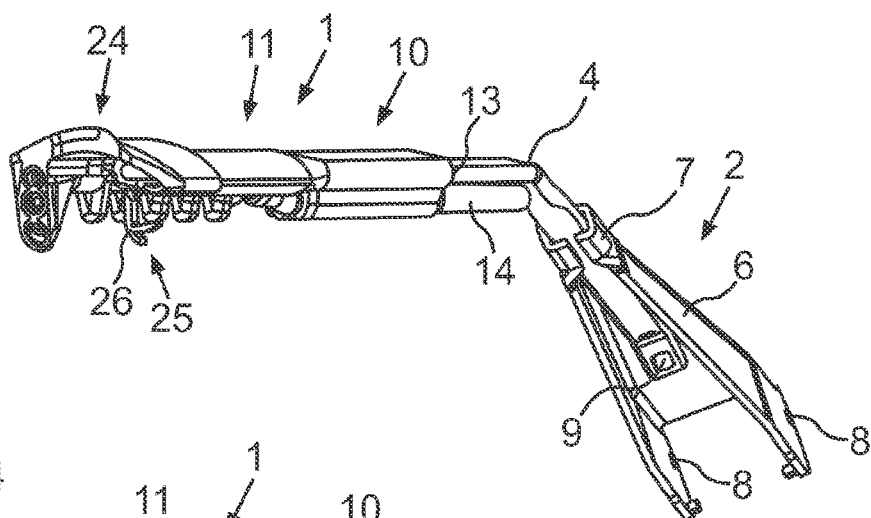
Figure 1C:
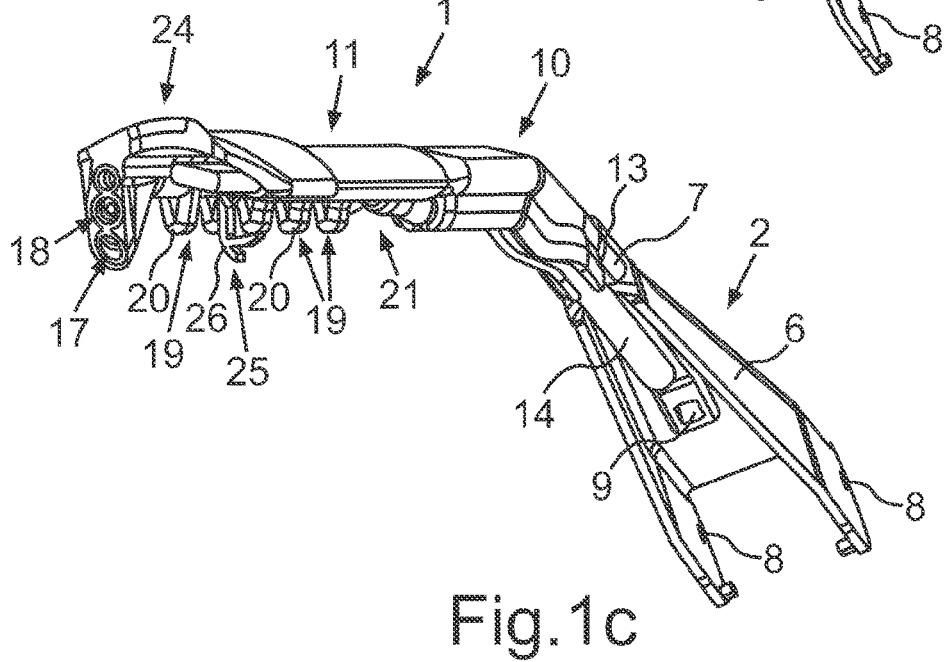

FIGS. 1a, 1b and 1c show a mounting sequence for arranging and fixing a functional element 1, explained in more detail below, to a wiper arm 2 in a respective perspective view. Herein, the wiper arm 2 and the functional element 1 are first illustrated separated in exploded manner in FIG. 1a.

Herein, it is in particular apparent that the wiper arm 2 includes a wiper rod 3, which is angularly formed in a bend area 4. The wiper rod 3 is fixedly connected to a spring case 6 on a side opposite to a free end 5, which is at least substantially rectangularly formed in cross-section in a connection area 7 and crimped onto the wiper rod 3 also at least substantially rectangular in cross-section. The spring case 6 is connected to a lever element, not illustrated, of the windscreen wiper system in articulated manner via bearing openings 8, which is occasionally also referred to as attachment part, which in turn is rotationally fixedly connected to an associated drive shaft of a drive motor. The wiper arm 2 is pivotable around the axis formed by the bearing pins 8 with respect to the associated lever element against the spring force of a spring element, which in turn can be hooked in a spring receptacle 9 at the corresponding end of the wiper rod 3, for example to press the wiper arm 2 and an associated wiper blade, respectively, against the surface of a front windscreen in the operating position.

The functional element 1 comprises a first partial area 10 and a second partial area 11 formed integrally with it, within which a continuous receiving channel 12 for the wiper rod 3 is provided. Therein, the receiving channel 12 is at least substantially adapted in cross-section to the approximately rectangular cross-section of the wiper rod 3, which has an at least substantially uniform cross-section over its entire extension. Accordingly, the receiving channel 12 also has a substantially uniform cross-section over its entire length within the functional element 1.

As is further apparent in synopsis with the FIGS. 1b and 1c, the functional element 1 can accordingly be fitted or shifted onto the wiper rod 3 from the free end 5 until an end 13 of the first partial area 10 of the functional element 1 joins to the connection area 7 of the spring case 6 in at least substantially flush manner. In order that fitting of the functional element 1 onto the wiper rod 3 up to the spring case 6 can be effected, the functional element 1 is manufactured of an elastic material, for example a corresponding plastic, in the first partial area 10—starting from the end 13—at least over the bend area 4. By this soft-elastic material, it is optionally also conceivable that the connection area 7 of the spring case 6 is surmounted by the end 13 of the partial area 10 of the functional element 1 in sleeve-like manner.

In addition, the end 13 of the partial area 10 is surmounted by a conduit part 14, via which the functional element 1 can be supplied with a windscreen cleaning liquid in a manner described in more detail below. Accordingly, at least one supply channel 15 for windscreen cleaning liquid is formed within the conduit part 14, via which the functional element 1 can be supplied with windscreen cleaning liquid in a manner described in more detail below. This supply channel 15 further extends also over the partial area 10 as well as over the partial area 11 of the functional element 1. Accordingly, a windscreen cleaning device 16 or a part of it is formed in the functional element 1 such that the wiper arm 2 is a so-called wet wiper arm in the present case. This means that the windscreen to be cleaned by means of the windscreen wiper system, in particular the front windscreen of the motor vehicle, can be supplied with windscreen cleaning liquid via nozzles, which are carried by the wiper arm 2. Therein, the end of the conduit part 14 of the functional element 1 is connected to the windscreen cleaning system for windscreen cleaning liquid along with associated pump via a channel arrangement not further shown. Usually, it is accommodated in the front space or engine compartment of the motor vehicle. As is in particular apparent from FIG. 1c, the conduit part 14 extends on the bottom side of the wiper rod 3 further up to the interior of the spring case 6 in the present case.

In synopsis of the FIGS. 1a to 1c, it is furthermore apparent that shifting the functional element 1 onto the wiper rod 3 is effected until it—as is apparent from FIG. 1c in the finally mounted position of the functional element 1—protrudes from the receiving channel 12 over a substantial length area at a free end 5. Inversely, this means that the functional element 1 with the partial areas 10, 11 is connected to a length area of the wiper rod 3 spaced from the free end 5 of the wiper rod 3 via the receiving channel 12.

In other words, the free end 5 protrudes beyond the partial area 11 of the functional element 1 and from the receiving channel 12, respectively.

The windscreen cleaning device 16 integrated in the functional element 1 presently includes a channel system with respective channels integrated in the functional element 1, which open into diverse nozzles, via which the windscreen to be cleaned and to be wiped, respectively, and the wiper blade explained in more detail below, respectively, can be supplied with windscreen cleaning liquid.

Thus, the windscreen cleaning device 16 first includes two outer circle nozzles 17, 18, via which the wiper blade is supplied in the near area of its outer circle, thus that area, in which the wiper blade traverses the largest radius of its surface to be wiped. Therein, the outer circle nozzle 17 covers an area closer to the functional element 1 and the outer circle nozzle 18 covers an area further away from the functional element 1 near the outer circle of the corresponding wiper blade.

In addition, the windscreen cleaning device 16 includes a plurality of presently five central nozzles 19, which all extend at least substantially in a row along the extension direction of the functional element 1. The respective nozzles 19 are accommodated in respectively associated protrusions 20 protruding from the functional element 1 and from the wiper arm 2, respectively, towards the windscreen to be wiped and to be cleaned in a manner described below. Finally, the windscreen cleaning device 16 includes at least one inner circle nozzle 21, via which the wiper blade of the wiper arm 2 is supplied with cleaning liquid in the area of its inner circle, in which the wiper blade traverses its shortest radius of the corresponding wiping surface in the wiping operation. Therein, all of the nozzles 17, 18, 19 and 21 can be adjusted such that they apply the cleaning liquid to the windscreen, in particular the front windscreen, at a corresponding distance in front of the wiper blade moving thereto upon a start movement, thus upon an upwards movement of the respective wiper arm 2 in case of a front windscreen. Optionally, the wiper blade can also be immediately supplied with the windscreen cleaning liquid.

Besides the integration of the windscreen cleaning device 16, the functional element 1 includes the further function of wind deflection. Accordingly, the functional element 1 is formed as a wind deflector 22 in the present case and includes a wind deflecting contour 23 on the front and top side, respectively, at least substantially facing away from the nozzles 19 as well as the wiper rod 3 to accordingly allow a particularly beneficial overflow of the air usually flowing to the respective wiper arm 2 and the corresponding wiper blade, respectively, from the front.

Thus, the present functional element 1 is formed as a wind deflector 22 and for integration of the windscreen cleaning device 16. However, it is to be considered as encompassed within the scope of the invention that the functional element 1 could also perform only one of these two functions.

Figure 2A:
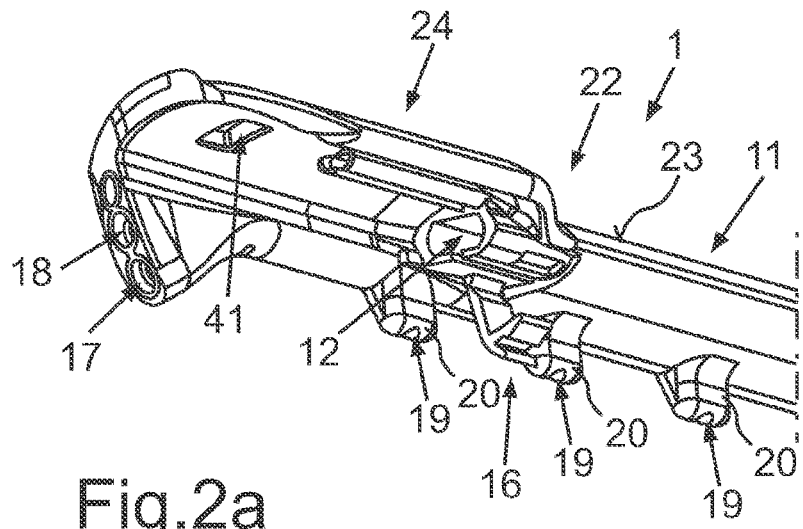
Figure 2B:
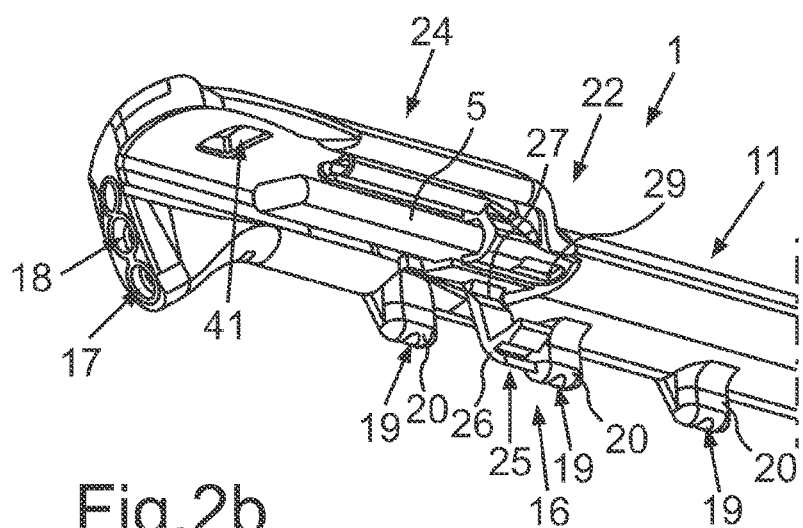
Figure 2C:
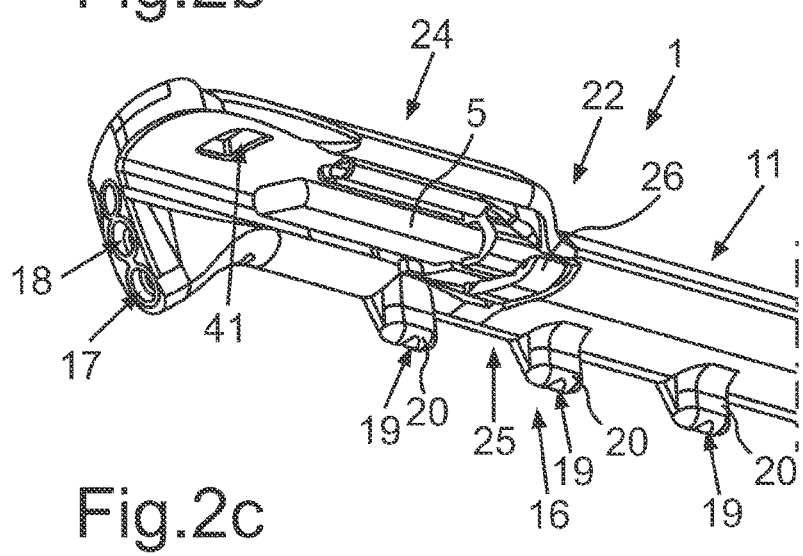

The FIGS. 2a to 2c show the functional element 1 of the embodiment described in the FIGS. 1a to 1c in respective partial and perspective bottom views. Therein, the receiving channel for the wiper rod 3 is in particular apparent from FIG. 2a, which from a third partial area 24 of the functional element 1, which is also formed integrally with the partial areas 10 and 11. Therein, the FIGS. 2b and 2c show the position of the functional element 1 when it is completely fitted onto the wiper rod 3. In this position, the third partial area 24 of the functional element 1 covers the free end 5 of the wiper rod 3, in particular at the front side thereof and on the bottom side thereof—related to the installation position of the wiper arm 2. Further, it is apparent that the wiper rod 3 is arranged recessed with respect to the partial area 24.

Based on a synopsis of the FIGS. 2a and 2b with that according to FIG. 2c, it is additionally apparent that the functional element 1 is arranged secured to the wiper rod 3 of the wiper arm 2 in extension direction of the receiving channel 12 by means of an attachment device 25 in the present case. In the present case, the securement is effected by means of a flap 26, which is pivotably arranged on the functional element 1 via a film hinge 27. If the flap 26 is inserted by means of a locking element 28 into a locking receptacle 29 provided hereto in the area of the receiving channel 12, thus, the locking element 28 also engages with a groove 30 (FIG. 1a) within the wiper rod 3. Hereby, an axial securement of the functional element 1 on the wiper rod virtually results such that the functional element 1 is correspondingly secured in position after shifting onto the wiper rod 3.

Figure 3A:
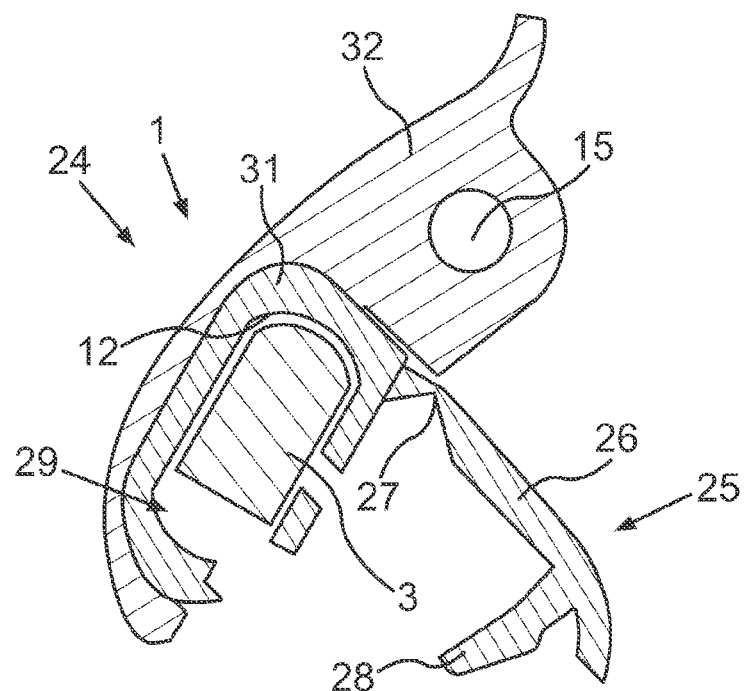
FIG. 3a, 3b respective sectional views through the functional element in its position arranged on the wiper rod, wherein in FIG. 3a the attachment device for fixing the functional element to the wiper rod is illustrated in opened state and in FIG. 3b the attachment device is illustrated in closed position fixing the functional element to the wiper rod.
Figure 3B:
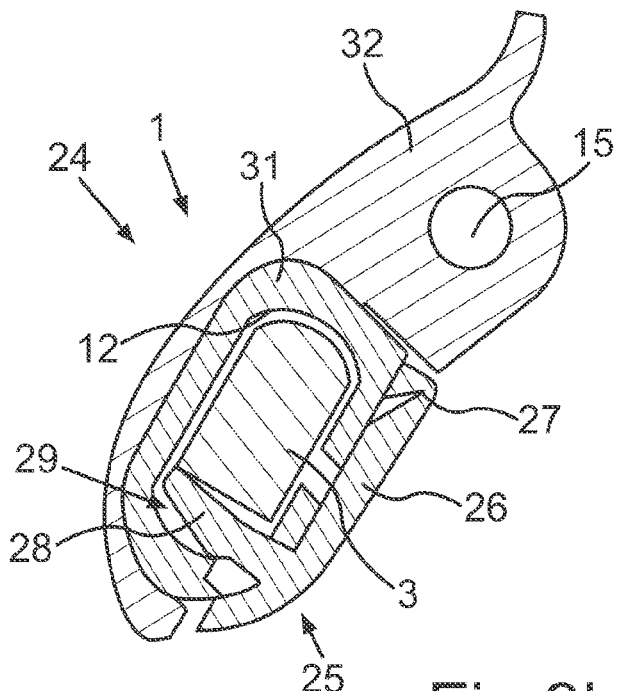

In the FIGS. 3a and 3b, the attachment device 25 is again explained in its functionality in a respective sectional view of the arrangement of the functional element 1 on the wiper rod 3. Herein, it is in particular apparent how the axial securement of the locking element 28 on the side of the flap 26 within the locking receptacle 29 or at the groove 30 of the wiper rod 3 results.

Based on the different hatchings, it additionally becomes clear from the FIGS. 3a and 3b that the functional element 1 is presently manufactured as a plastic part in a two-component method. Herein, it is in particular apparent that the receiving channel 12 is formed by a hard component 31 in the area of the attachment device 25. Similarly, the respective channels carrying the cleaning liquid in the second and third partial areas 11, 24 of the functional element 1 are formed of this hard component 31 at least in the area of the respective nozzles 17, 18, 19, 21. Therebetween, parts can also be formed by a soft component 32 of the plastic, which incidentally also form the first partial area 10 and the conduit part 14—as already explained. The wind deflector contour 23 of the functional element 1 is also formed by the soft component 32—as it is apparent from the FIGS. 3a and 3b. Therein, the components 31, 32 are in particular formed UV-resistant to be correspondingly permanently durable.

Figure 4A:
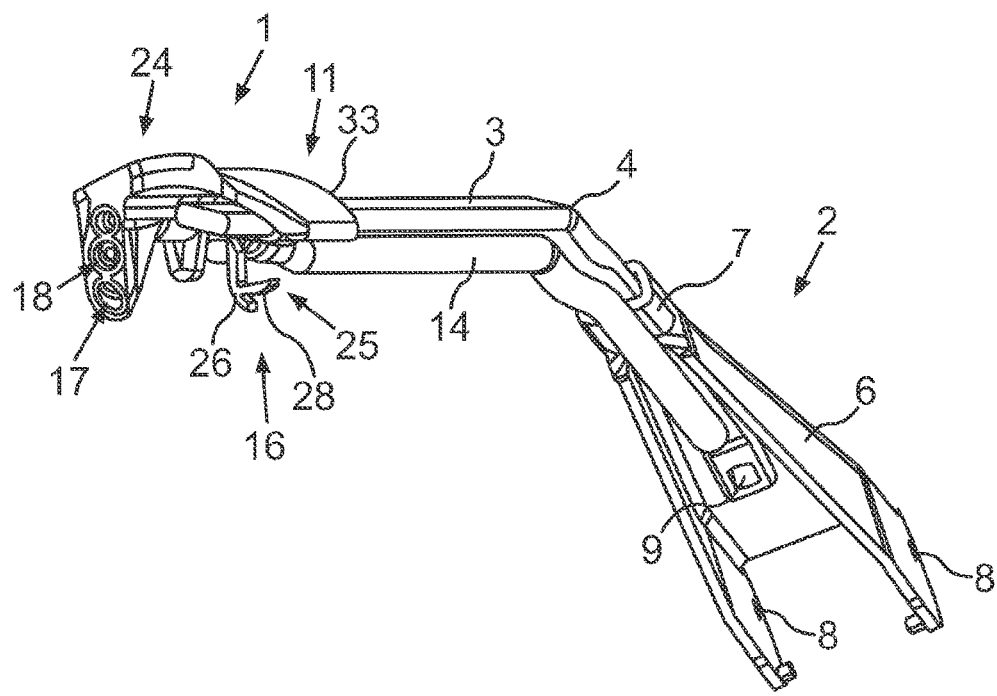
Figure 4B:
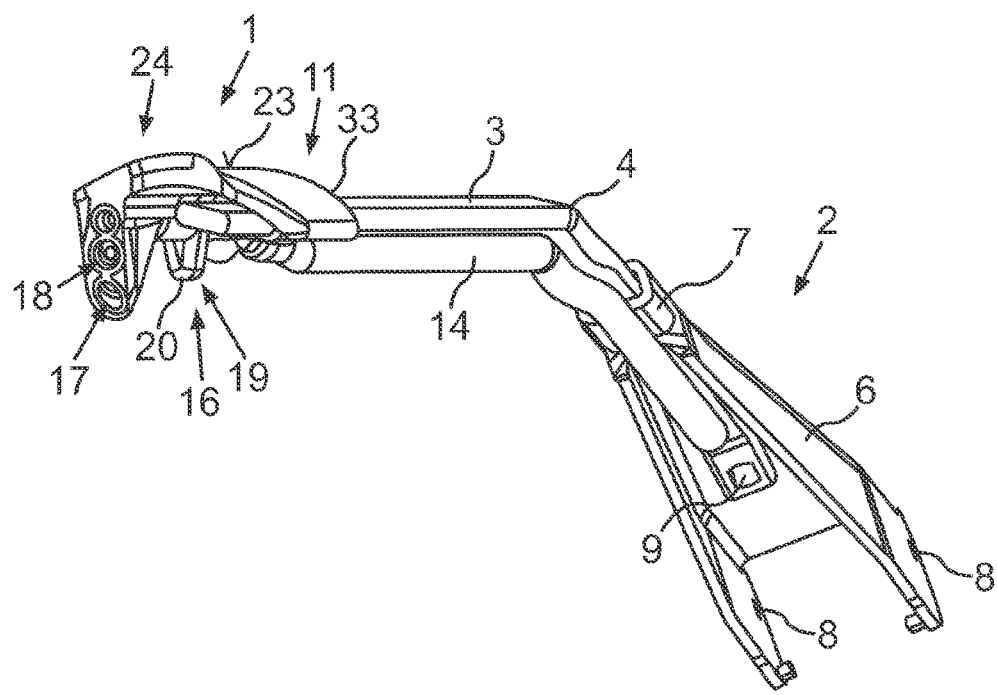

In the FIGS. 4a and 4b, an alternative embodiment of the functional element 1 is illustrated in a respective perspective view. This functional element 1 is substantially identical to that according to the first described embodiment in its configuration and function such that only the differences are to be addressed below.

This functional element 1 substantially differs in that in it the first partial area 10 of the functional element 1, which extends between the second partial area 11 and the connection area 7 of the spring case 6, is not provided here. Rather, the functional element 1 terminates with an end 33 at a distance before the bend area 4 and accordingly at a substantial distance before the connection area 7 of the spring case 6. The conduit part 14 of the functional element 1 accordingly extends over a substantial length without additional sheathing of the wiper rod 3 below or inside it up into the spring case 6, from where the further connection for supply with the cleaning liquid is effected.

Depending on how shortly the functional element 1 is formed, one or multiple respective inner circle nozzles 21 can optionally be omitted in some embodiments. Such a configuration for example arises in vehicles of the compact class, in which a relatively low windscreen surface has to be wiped and cleaned, respectively. On a respective passenger's side of a larger windscreen too, such a concept optionally also offers itself. Incidentally, the windscreen cleaning device 16 integrated in the functional element 1 has a configuration at least substantially identical to the embodiment already described in context of the FIGS. 1a to 3b. However—according to length of the functional element 1 and in particular of the partial areas 11 and 24, respectively—a lower number of central nozzles 19 can be provided. In the present embodiment too, the locking element 28 is again apparent, by means of which the functional element 1 can be secured after fitting onto the wiper rod 3.

Figure 5A:
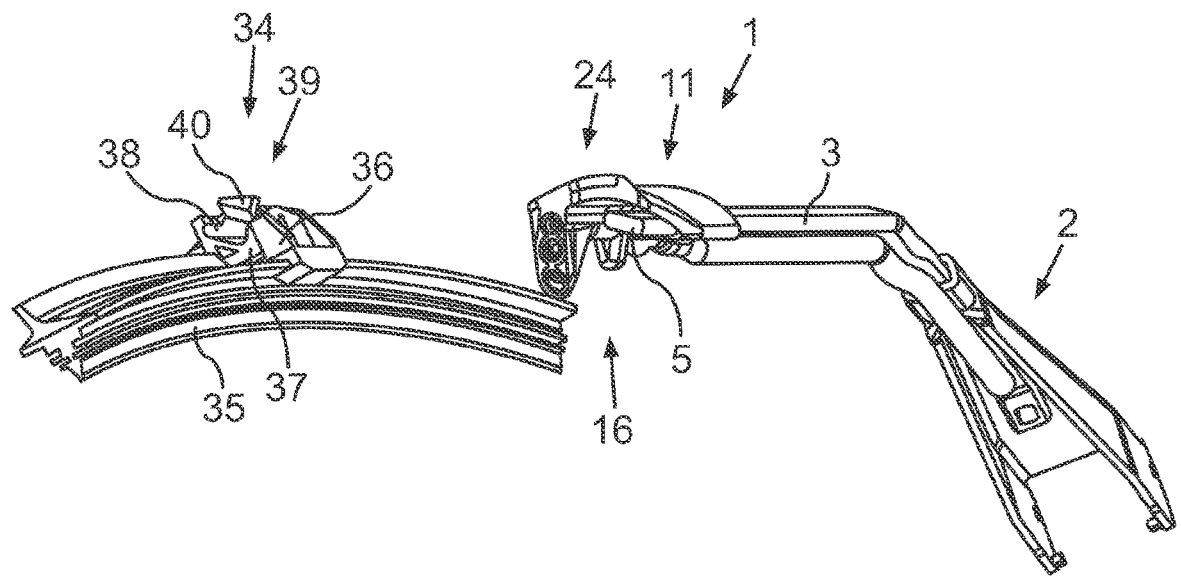
Figure 5B:
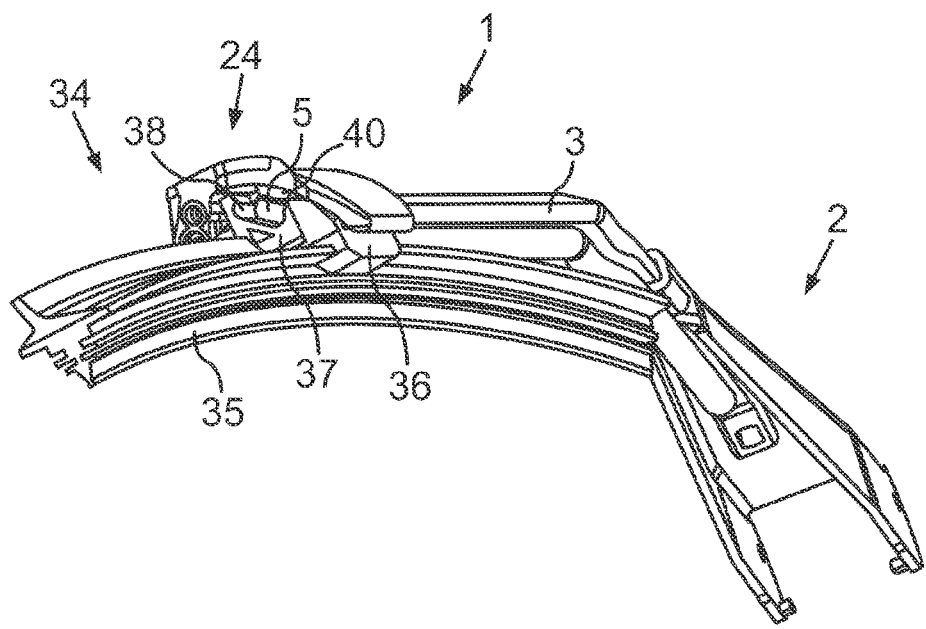

In the FIGS. 5a and 5b, mounting of a wiper blade 34 on the corresponding free end 5 of the wiper rod 3, which protrudes from the receiving channel 12 of the functional element 1, is finally illustrated in a respective perspective view. Therein, the wiper blade 34 includes a wiper blade element 35, to which a basic body in the form of a slider 36 is attached. This slider 36 is in turn connected to an adapter 37 in articulated manner such that the wiper blade element 35 with the slider 36 can be pivoted relatively to the adapter 37 to a certain extent. The adapter 37 includes a receptacle 38 formed at least partially open in the present case, via which the adapter 37 and thus the entire wiper blade 34, respectively, can be fitted at the free end 5 of the wiper rod 3. Hereto, the receptacle 38, which is formed as a type of plug-in receptacle, is adapted in its cross-section and in its shape, respectively, to the cross-section of the wiper rod 3. After the adapter 37 with the receptacle 38 is fitted onto the free end 5 of the wiper rod 3 over a certain length area, a locking device 39 engages, which includes a corresponding locking element both on the side of the adapter 37 and on the side of the wiper rod 3. This locking device 39 can for example include a locking pin or the like on the side of the adapter 37, which engages with a locking recess on the side of the free end 5 of the wiper rod 3. Therein, the locking device 39 is detachable by means of an actuating element 40 in the form of a push button or the like, which has to be pressed towards the wiper blade element 39 in the present case.

In its locked position, this actuating element 40 penetrates a passage opening 42 within the partial area 24 of the functional element 1. In the locked position of the locking device 39, thus, the actuating element 40 is at least substantially arranged within this passage opening 41 and accordingly can be actuated from the front outside to remove the wiper blade 34 from the free end 5 of the wiper rod 3.

Since the functional element 1 thus is attached to the wiper rod 3 in a length area of it spaced from the free end 5 and the adapter 37 of the wiper blade 34 is attached to the free end 5 of the wiper rod, a completely independent respective arrangement and fixing to the wiper rod 3 results for the functional element 1 and the wiper blade 34. This has the advantage that the wiper blade 34 can be removed and for example exchanged from time to time completely independently of the functional element 1 without this having an influence on the functionality of the functional element 1. Therein, it is in particular to be taken into account that both the wind deflecting function and the windscreen cleaning function of the functional element 1 is completely maintained even if the adapter 37 is removed, but the functional element 1 remains on the wiper rod 3. In contrast to other systems, thus, a part of the wind deflecting device or the windscreen cleaning device is not removed and for example disposed of with the exchange of the wiper blade 34, which creates corresponding financial problems and problems arising with respect to the sustainability. Rather, a system is thus provided, in which the connection of the wiper blade 34 and the connection of the functional element 1 as well as performing the functions accomplished by the functional element are completely autonomous from each other.

Moreover, further elements can be integrated in the functional element 1. In particular, a heating for the windscreen cleaning device can also be integrated. Here too, the advantages already described in context of the windscreen cleaning device arise.

Overall, the examples show how a windscreen washer system can be provided by the invention, in which the functional element 1 and the wiper blade 34 can be arranged on and fixed to the wiper rod 3 completely independently of each other.

The invention claimed is:
1. A windscreen wiper system for a motor vehicle, the wiper system comprising:
   at least one wiper blade;
   a slider attached to a wiper blade element of said at least one wiper blade;
   an adapter connected to said slider in an articulated manner, said adapter being formed with a receptacle configured for connection to a wiper rod of a wiper arm for connecting said wiper blade to the wiper arm of the windscreen wiper system;

a functional element arranged on the wiper rod of the wiper arm, separately from said adapter; and a locking device for fixing the wiper rod to said adapter, said locking device being detachable by way of an actuating element, and wherein said functional element is formed with a passage opening, in which the actuating element of said locking device is arranged.

2. The windscreen wiper system according to claim 1, wherein said functional element is a wind deflector.

3. The windscreen wiper system according to claim 1, further comprising a windscreen cleaning device integrated in said functional element.

4. The windscreen wiper system according to claim 1, wherein said adapter is at least substantially covered by said functional element.

5. The windscreen wiper system according to claim 1, wherein said adapter is to be connected at a free end of the wiper rod and said functional element is connected to a length area of the wiper rod that is spaced from the free end.

6. The windscreen wiper system according to claim 1, wherein said functional element extends up to a spring case of the wiper arm.

7. The windscreen wiper system according to claim 1, wherein said functional element terminates at a distance before a spring case of the wiper arm.

8. The windscreen wiper system according to claim 1, further comprising an attachment device configured to secure said functional element on the wiper rod of the wiper arm.

\* \* \* \* \*